US007016080B2

(12) United States Patent
Edgar

(10) Patent No.: US 7,016,080 B2
(45) Date of Patent: Mar. 21, 2006

(54) METHOD AND SYSTEM FOR IMPROVING SCANNED IMAGE DETAIL

(75) Inventor: Albert D. Edgar, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 1056 days.

(21) Appl. No.: 09/960,239

(22) Filed: Sep. 21, 2001

(65) Prior Publication Data

US 2002/0126327 A1  Sep. 12, 2002

Related U.S. Application Data

(60) Provisional application No. 60/285,591, filed on Apr. 19, 2001, provisional application No. 60/234,520, filed on Sep. 21, 2000, provisional application No. 60/234,408, filed on Sep. 21, 2000.

(51) Int. Cl.
  G06K 15/00 (2006.01)
  G06K 9/40 (2006.01)
(52) U.S. Cl. .................... 358/3.15; 358/3.27; 358/532; 382/266
(58) Field of Classification Search ................. 358/1.9, 358/2.1, 3.04, 3.01, 3.09, 3.1, 3.11, 3.12, 358/3.15, 3.26, 3.27, 532, 530, 448; 382/210, 382/266

See application file for complete search history.

(56) References Cited

U.S. PATENT DOCUMENTS

| | | | |
|---|---|---|---|
| 2,404,138 A | 7/1946 | Mayer ............................ | 95/94 |
| 3,520,689 A | 7/1970 | Nagae et al. .................. | 96/55 |
| 3,520,690 A | 7/1970 | Nagae et al. .................. | 96/55 |
| 3,587,435 A | 6/1971 | Chioffe ......................... | 95/89 |
| 3,615,479 A | 10/1971 | Kohler et al. ................. | 96/48 |
| 3,615,498 A | 10/1971 | Aral .............................. | 96/55 |
| 3,617,282 A | 11/1971 | Bard ............................. | 96/59 |
| 3,747,120 A | 7/1973 | Stemme ....................... | 346/75 |
| 3,833,161 A | 9/1974 | Krumbein .................... | 226/92 |
| 3,903,541 A | 9/1975 | Von Meister et al. ....... | 354/317 |
| 3,946,398 A | 3/1976 | Kyser et al. .................. | 346/1 |
| 3,959,048 A | 5/1976 | Stanfield et al. ............. | 156/94 |
| 4,026,756 A | 5/1977 | Stanfield et al. ............ | 156/554 |
| 4,081,577 A | 3/1978 | Horner ....................... | 427/424 |
| 4,142,107 A | 2/1979 | Hatzakis et al. ............ | 250/571 |
| 4,215,927 A | 8/1980 | Grant et al. ................ | 354/317 |

(Continued)

FOREIGN PATENT DOCUMENTS

EP   0 261 782 A2   8/1987

(Continued)

OTHER PUBLICATIONS

"Adaptive Fourier Threshold Filtering: A Method to Reduce Noise and Incoherent Artifacts in High Resolution Cardiac Images", Doyle, M., et al., 8306 Magnetic Resonance in Medicine 31, No. 5, Baltimore, MD, May, pp. 546-550, 1994.

(Continued)

Primary Examiner—Jerome Grant, II
(74) Attorney, Agent, or Firm—Buskow Law Group

(57) ABSTRACT

Methods are provided for generating a dynamic image mask for improving image detail in a digital image. An electronic representation of an image is scanned. A dynamic image mask is generated from the electronic representation of the image. The dynamic image mask has sharp edges which are representative of rapidly changing boundaries in the original image and blurred regions in less rapidly changing areas. The dynamic image mask can be applied to the electronic representation of the original image to improve image detail by altering the image contrast and the grayscale contrast.

41 Claims, 2 Drawing Sheets

U.S. PATENT DOCUMENTS

| | | | | |
|---|---|---|---|---|
| 4,249,985 A | 2/1981 | Stanfield | ...... | 156/554 |
| 4,265,545 A | 5/1981 | Slaker | ...... | 356/431 |
| 4,301,469 A | 11/1981 | Modeen et al. | ...... | 358/75 |
| 4,490,729 A | 12/1984 | Clark et al. | ...... | 346/75 |
| 4,501,480 A | 2/1985 | Matsui et al. | ...... | 354/298 |
| 4,564,280 A | 1/1986 | Fukuda | ...... | 354/317 |
| 4,594,598 A | 6/1986 | Iwagami | ...... | 346/140 |
| 4,621,037 A | 11/1986 | Kanda et al. | ...... | 430/30 |
| 4,623,236 A | 11/1986 | Stella | ...... | 354/318 |
| 4,633,300 A | 12/1986 | Sakai | ...... | 358/41 |
| 4,636,808 A | 1/1987 | Herron | ...... | 346/75 |
| 4,666,307 A | 5/1987 | Matsumoto et al. | ...... | 356/404 |
| 4,670,779 A | 6/1987 | Nagano | ...... | 358/75 |
| 4,736,221 A | 4/1988 | Shidara | ...... | 354/317 |
| 4,741,621 A | 5/1988 | Taft et al. | ...... | 356/376 |
| 4,745,040 A | 5/1988 | Levine | ...... | 430/21 |
| 4,755,844 A | 7/1988 | Tsuchiya et al. | ...... | 354/317 |
| 4,777,102 A | 10/1988 | Levine | ...... | 430/21 |
| 4,796,061 A | 1/1989 | Ikeda et al. | ...... | 355/73 |
| 4,814,630 A | 3/1989 | Lim | ...... | 250/578 |
| 4,821,114 A | 4/1989 | Gebhardt | ...... | 358/75 |
| 4,845,551 A | 7/1989 | Matsumoto | ...... | 358/80 |
| 4,851,311 A | 7/1989 | Millis et al. | ...... | 430/30 |
| 4,857,430 A | 8/1989 | Millis et al. | ...... | 430/30 |
| 4,875,067 A | 10/1989 | Kanzaki et al. | ...... | 354/325 |
| 4,969,045 A | 11/1990 | Haruki et al. | ...... | 358/228 |
| 4,994,918 A | 2/1991 | Lingemann | ...... | 358/214 |
| 5,027,146 A | 6/1991 | Manico et al. | ...... | 354/299 |
| 5,034,767 A | 7/1991 | Netz et al. | ...... | 354/317 |
| 5,081,692 A * | 1/1992 | Kwon et al. | ...... | 382/263 |
| 5,101,286 A | 3/1992 | Patton | ...... | 358/487 |
| 5,124,216 A | 6/1992 | Giapis et al. | ...... | 430/30 |
| 5,155,596 A | 10/1992 | Kurtz et al. | ...... | 358/214 |
| 5,196,285 A | 3/1993 | Thomson | ...... | 430/30 |
| 5,200,817 A | 4/1993 | Birnbaum | ...... | 358/80 |
| 5,212,512 A | 5/1993 | Shiota | ...... | 354/319 |
| 5,231,439 A | 7/1993 | Takahashi et al. | ...... | 354/313 |
| 5,235,352 A | 8/1993 | Pies et al. | ...... | 346/140 |
| 5,255,408 A | 10/1993 | Blackman | ...... | 15/308 |
| 5,266,805 A | 11/1993 | Edgar | ...... | 250/330 |
| 5,267,030 A | 11/1993 | Giorgianni et al. | ...... | 358/527 |
| 5,292,605 A | 3/1994 | Thomson | ...... | 430/30 |
| 5,296,923 A | 3/1994 | Hung | ...... | 358/527 |
| 5,334,247 A | 8/1994 | Columbus et al. | ...... | 118/411 |
| 5,350,651 A | 9/1994 | Evans et al. | ...... | 430/21 |
| 5,350,664 A | 9/1994 | Simons | ...... | 430/362 |
| 5,357,307 A | 10/1994 | Glanville et al. | ...... | 354/324 |
| 5,360,701 A | 11/1994 | Elton et al. | ...... | 430/501 |
| 5,371,542 A | 12/1994 | Pauli et al. | ...... | 348/242 |
| 5,391,443 A | 2/1995 | Simons et al. | ...... | 430/21 |
| 5,414,779 A | 5/1995 | Mitch | ...... | 382/199 |
| 5,416,550 A | 5/1995 | Skye et al. | ...... | 354/298 |
| 5,418,119 A | 5/1995 | Simons | ...... | 430/507 |
| 5,418,597 A | 5/1995 | Lahcanski et al. | ...... | 355/76 |
| 5,432,579 A | 7/1995 | Tokuda | ...... | 354/293 |
| 5,436,738 A | 7/1995 | Manico | ...... | 358/503 |
| 5,440,365 A | 8/1995 | Gates et al. | ...... | 354/298 |
| 5,447,811 A | 9/1995 | Buhr et al. | ...... | 430/20 |
| 5,448,380 A | 9/1995 | Park | ...... | 358/520 |
| 5,452,018 A | 9/1995 | Capitant et al. | ...... | 348/651 |
| 5,465,155 A | 11/1995 | Edgar | ...... | 358/500 |
| 5,477,345 A | 12/1995 | Tse | ...... | 358/500 |
| 5,496,669 A | 3/1996 | Pforr et al. | ...... | 430/22 |
| 5,516,608 A | 5/1996 | Hobbs et al. | ...... | 430/30 |
| 5,519,510 A | 5/1996 | Edgar | ...... | 358/471 |
| 5,546,477 A | 8/1996 | Knowles et al. | ...... | 382/242 |
| 5,550,566 A | 8/1996 | Hodgson et al. | ...... | 345/202 |
| 5,552,904 A | 9/1996 | Ryoo et al. | ...... | 358/518 |
| 5,563,717 A | 10/1996 | Koeng et al. | ...... | 358/406 |
| 5,568,270 A | 10/1996 | Endo | ...... | 358/298 |
| 5,576,836 A | 11/1996 | Sano et al. | ...... | 358/302 |
| 5,581,376 A | 12/1996 | Harrington | ...... | 358/518 |
| 5,587,752 A | 12/1996 | Petruchik | ...... | 396/315 |
| 5,596,415 A | 1/1997 | Cosgrove et al. | ...... | 358/296 |
| 5,627,016 A | 5/1997 | Manico | ...... | 430/434 |
| 5,649,260 A | 7/1997 | Wheeler et al. | ...... | 396/569 |
| 5,664,253 A | 9/1997 | Meyers | ...... | 396/603 |
| 5,664,255 A | 9/1997 | Wen | ...... | 396/627 |
| 5,667,944 A | 9/1997 | Reem et al. | ...... | 430/359 |
| 5,678,116 A | 10/1997 | Sugimoto et al. | ...... | 396/611 |
| 5,691,118 A | 11/1997 | Haye | ...... | 430/357 |
| 5,695,914 A | 12/1997 | Simon et al. | ...... | 430/379 |
| 5,698,382 A | 12/1997 | Nakahanada et al. | ...... | 430/418 |
| 5,726,773 A | 3/1998 | Mehlo et al. | ...... | 358/474 |
| 5,739,897 A | 4/1998 | Frick et al. | ...... | 355/40 |
| 5,771,107 A | 6/1998 | Fujimoto et al. | ...... | 358/464 |
| 5,790,277 A | 8/1998 | Edgar | ...... | 358/487 |
| 5,835,795 A | 11/1998 | Craig et al. | ...... | 396/6 |
| 5,835,811 A | 11/1998 | Tsumura | ...... | 396/598 |
| 5,845,007 A * | 12/1998 | Ohashi et al. | ...... | 382/199 |
| 5,870,172 A | 2/1999 | Blume | ...... | 355/27 |
| 5,880,819 A | 3/1999 | Tanaka et al. | ...... | 355/75 |
| 5,892,595 A | 4/1999 | Yamakawa et al. | ...... | 358/530 |
| 5,930,388 A | 7/1999 | Murakami et al. | ...... | 382/167 |
| 5,959,720 A | 9/1999 | Kwon et al. | ...... | 355/38 |
| 5,963,662 A | 10/1999 | Vachtsevanos et al. | ...... | 382/150 |
| 5,966,465 A | 10/1999 | Keith et al. | ...... | 382/232 |
| 5,979,011 A | 11/1999 | Miyawaki et al. | ...... | 15/308 |
| 5,982,936 A | 11/1999 | Tucker et al. | ...... | 382/233 |
| 5,982,937 A | 11/1999 | Accad | ...... | 382/239 |
| 5,982,941 A | 11/1999 | Loveridge et al. | ...... | 382/260 |
| 5,982,951 A | 11/1999 | Katayama et al. | ...... | 382/284 |
| 5,988,896 A | 11/1999 | Edgar | ...... | 396/604 |
| 5,991,444 A | 11/1999 | Burt et al. | ...... | 382/232 |
| 5,998,109 A | 12/1999 | Hirabayashi | ...... | 430/434 |
| 6,000,284 A | 12/1999 | Shin et al. | ...... | 73/150 |
| 6,005,987 A | 12/1999 | Nakamura et al. | ...... | 382/294 |
| 6,065,824 A | 5/2000 | Bullock et al. | ...... | 347/19 |
| 6,069,714 A | 5/2000 | Edgar | ...... | 358/487 |
| 6,088,084 A | 7/2000 | Nishio | ...... | 355/75 |
| 6,089,687 A | 7/2000 | Helterline | ...... | 347/7 |
| 6,094,511 A * | 7/2000 | Metcalfe et al. | ...... | 382/260 |
| 6,101,273 A | 8/2000 | Matama | ...... | 382/169 |
| 6,102,508 A | 8/2000 | Cowger | ...... | 347/7 |
| 6,137,965 A | 10/2000 | Burgeios et al. | ...... | 396/626 |
| 6,200,738 B1 | 3/2001 | Takano et al. | ...... | 430/362 |
| 2002/0126327 A1 * | 9/2002 | Edgar | ...... | 358/517 |
| 2002/0176113 A1 * | 11/2002 | Edgar | ...... | 358/3.27 |
| 2004/0234153 A1 * | 11/2004 | Nakami | ...... | 382/254 |
| 2005/0006598 A1 * | 1/2005 | Pearl | ...... | 250/492.1 |

FOREIGN PATENT DOCUMENTS

| | | |
|---|---|---|
| EP | 0 422 220 A1 | 3/1989 |
| EP | 0 482 790 B1 | 9/1991 |
| EP | 0 525 886 A3 | 7/1992 |
| EP | 0543386 * | 5/1993 |
| EP | 0 580 293 A1 | 6/1993 |
| EP | 0 580 293 A1 | 1/1994 |
| EP | 0 601 364 A1 | 6/1994 |
| EP | 0 669 753 A2 | 2/1995 |
| EP | 0 794 454 A2 | 2/1997 |
| EP | 0 768 571 A2 | 4/1997 |
| EP | 0 806 861 A1 | 11/1997 |
| EP | 0 878 777 A2 | 11/1998 |
| EP | 0 930 498 A2 | 12/1998 |
| WO | WO 90/01240 | 2/1990 |
| WO | WO 91/09493 | 6/1991 |
| WO | WO 97/25652 | 7/1997 |
| WO | WO 98/19216 | 5/1998 |
| WO | WO 98/25399 | 6/1998 |
| WO | WO 98/31142 | 7/1998 |
| WO | WO 98/34157 | 8/1998 |
| WO | WO 98/34397 | 8/1998 |

| | | |
|---|---|---|
| WO | WO 99/43148 | 8/1999 |
| WO | WO 99/43149 | 8/1999 |
| WO | WO 01/01197 | 1/2001 |
| WO | WO 01/13174 A1 | 2/2001 |
| WO | WO 01/45042 A1 | 6/2001 |
| WO | WO 01/50192 A1 | 7/2001 |
| WO | WO 01/50193 A1 | 7/2001 |
| WO | WO 01/50194 A1 | 7/2001 |
| WO | WO 01/50197 A1 | 7/2001 |
| WO | WO 01/52556 A2 | 7/2001 |

OTHER PUBLICATIONS

"*Anisotropic Spectral Magnitude Estimation Filters for Noise Reduction and Image Enhancement*". Aich, T., et al., Philips GmbH Research Laboratories, IEEE, pp. 335-338, 1996.

"*Adaptive-neighborhood filtering of images corrupted by signal-dependent noise*", Rangayyan, R., et al., Applied Optics, vol. 37, No. 20, pp. 4477-4487, Jul. 10, 1998.

"*Grayscale Characteristics*", The Nature of Color Images, Photographic Negatives, pp. 163-168.

"*Parallel Production of Oligonucleotide Arrays Using Membranes and Reagent Jet Printing*", Stimpson, D., et al., Research Reports, BioTechniques, vol. 25, No. 5, pp. 886-890, 1998.

"*Low-Cost Display Assembly and Interconnect Using Ink-Jet Printing Technology*", Hayes, D. et al., Display Works '99, MicroFab Technologies, Inc., pp. 1-4, 1999.

"*Ink-Jet Based Fluid Microdispensing in Biochemical Applications*", Wallace, D., MicroFab Technologies, Inc., Laboratory Automation News, vol. 1, No. 5, pp. 6-9, Nov., 1996.

"*Protorealistic Ink-Jet Printing Through Dynamic Spot Size Control*", Wallace, D., Journal of Imaging Science and Technology, vol. 40, No. 5, pp. 390-395, Sep./Oct. 1996.

"*MicroJet Prinitng of Solder and Polymers for Multi-Chip Modules and Chip-Scale Package*", Hayes, D., et al., MicroFab Technologies, Inc.

"*A Method of Characterisstics Model of a Drop-on-Demand Ink-Jet Device using an Integral Method Drop Fomation Model*", Wallace, D., MicroFab Technologies, Inc., The American Society of Mechanical Engineers, Winter Annual Meeting, pp. 1-9, Dec. 10-15, 1989.

"*Digital Imaging Equipment White Papers*", Putting Damaged Film on ICE, www.nikonusa.com/reference/whitepapers/imaging, Nikon Corporation, Nov. 28, 2000.

\* cited by examiner

METHOD AND SYSTEM FOR IMPROVING SCANNED IMAGE DETAIL

CROSS REFERENCE TO RELATED APPLICATIONS

This application claims the benefit of the following U.S. Provisional Patent Applications: Ser. No. 60/234,520, filed on Sep. 21, 2000, and entitled "Method of Generating an Image Mask for Improving Image Detail;" Ser. No. 60/234,408, filed on Sep. 21, 2000, and entitled "Method of Applying An Image Mask For Improving Image Detail;" and Ser. No. 60/285,591 filed on Apr. 19, 2001, and entitled "Method and System and Software for Applying an Image Mask for Improving Image Detail;" of common assignee herewith.

FIELD OF THE INVENTION

The present invention relates generally to images and more particularly to improving the dynamic range of images.

BACKGROUND OF THE INVENTION

Images recorded on photographic film can represent a variety of dynamic ranges found in the subjects being recorded. Dynamic range is used to describe the variety of contrasts within an image. Dynamic range can include variations in intensity among a specific color, as well as variations in color.

The dynamic range of a film negative is greater than the dynamic range available in a photographic print or in paper. When photographic film is being developed in a photo lab, the lab technician must determine which portion of the dynamic range to use from the negative. Generally, when features in one portion of the dynamic range are chosen, other details must be left out.

Areas of the image can be selectively chosen to be bring out detail in various portions of the image and to improve the detail when printing the image. This process can be long and must be performed on each different image. Image masks can be generated for selecting the portions of the dynamic range for best selecting the image detail. An image mask can be applied to a digitized image to alter the image contrasts and increase detail in areas that would normally be lost when converting the image to a photographic print or paper. Generating a mask can be performed automatically by generating an unsharp mask (USM). However, when the USM is applied to an image, the masked image that results generally has aberrations along edges. Areas around an edge within the masked image may contain undesirable portions of lightened or darkened areas. Repairing the aberrations requires a technician to manually make changes to the masked image and can take several hours when handling multiple images.

SUMMARY OF THE INVENTION

The present invention provides a method of generating an image mask for an original image, the method comprises generating a decimated representation of the original image. The method further includes applying a blurring algorithm to form a blurred representation of the decimated representation. The blurred representation includes a plurality of pixels having varying values to form sharp edges representative of rapidly changing boundaries in the decimated image. The method further includes combining the blurred representation with the decimated representation.

An advantage of at least one embodiment of the present invention is that an image mask with sharp edges can be generated for improving the detail in a printed image. Another advantage of at least one embodiment of the present invention is that images with improved detail can be generated automatically. An additional advantage of at least one embodiment of the present invention is that calculations to improve the image detail in scanned images can be performed relatively quickly, due to a lower processing overhead less user intervention than conventional methods.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE INVENTION

Figure 1:
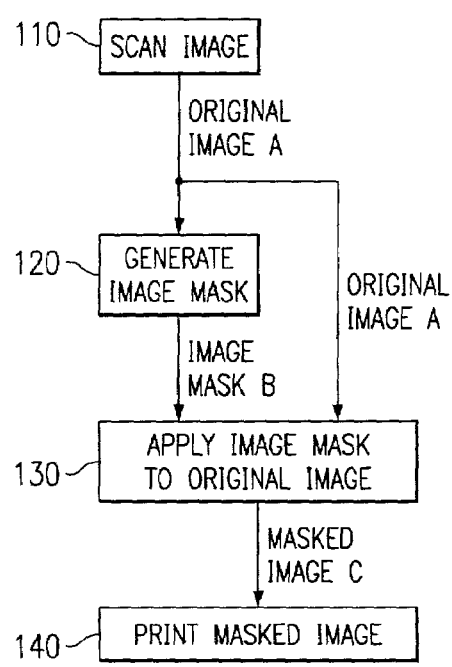
FIG. 1 is a block diagram illustrating a method for improving detail in a digital image, according to one embodiment of the present invention.

Referring now to FIG. 1, a method of generating an image mask for improving image detail in a digitized image is shown. A mask of a scanned image is generated and applied to original image to generate a masked image C. The masked image C can be used to provide an image with improved image detail within a reproducible dynamic range.

In step 110, an image is scanned to create a digital representation of an original image A. In one embodiment of the present invention, the image is recorded in photographic film. Once the photographic film has begun to develop, cameras can be used to generate an electronic representation (original image A) of the image stored in a negative of the photographic film. Recording the image directly from the negative can allow a representation to be taken using the high dynamic range available in the film negative. It will be appreciated that electronic representations may be taken of images recorded in other forms. For example, an image recorded in a photographic print can be scanned using an optical scanner to generate an electronic representation. Images may also be scanned from paper or magazine print.

In step 120, an image mask B is generated from the original image A. The original image A, from step 110, and the generated image mask B are composed of pixels. Each pixel, has information about a particular point in the image. Each pixel can include information on the intensity or color associated with its point. Every pixel on the image mask B is generated relative to a pixel in the original image A. In a preferred embodiment of the present invention, the pixels generated for image mask B are calculated from averages among neighboring pixels in original image A. The calculations are based upon changes in contrast in original image A.

Rapidly changing contrasts in original image A can be used to determine sharp edges in the generated image mask B. However, less rapidly changing contrast in original image A can be averaged to generate blurred regions in image mask B. The calculations performed on original image A can produce an image mask B which is capable of preserving the boundaries of original image A while blurring similar pixels, as will be discussed further in FIG. 2. The generated image mask can be referred to as a sharp unsharp mask (SUM), maintaining sharp boundaries of unsharp regions.

In step 130, the generated image mask B is applied to the scanned original image A. The original image A and the image mask B can be applied through an overlay. As discussed further in FIG. 4, a mathematical operation, including a division, between the pixel values of the original image A and the relative pixel values in the masked image B, is used to generate the masked image C. It will be appreciated that other functions for applying the masked image B to the original image A can be employed without departing from the scope of the present invention.

In step 140, the masked image C can be printed. When masked image C is printed, a large portion of its dynamic range may be lost. By using image mask B to generate masked image C (step 130), the desirable detail in original image A can be preserved. In step 140, the masked image is ready for delivery in the form desired. The form in which the image may be delivered includes, but is not limited to, an electronic form, a photographic print, or a film record. Electronic outputs can be represented as a digital file, stored on mass storage devices, tape drives, CD recorders, or DVD recorders. Electronic outputs can also be transferred to other systems using a communications adapter, where the file can be sent to the Internet, an intranet, as an e-mail, etc. The output can also be displayed as an image on a display or printed using a computer printer. The image can also be prepared for retrieval at an image processing kiosk which allows customers to recover their pictures and print them out in a form of their choosing without the assistance of a film development technician. Furthermore, the image can be represented on a form of film record, such as a film negative or positive image.

Figure 2:
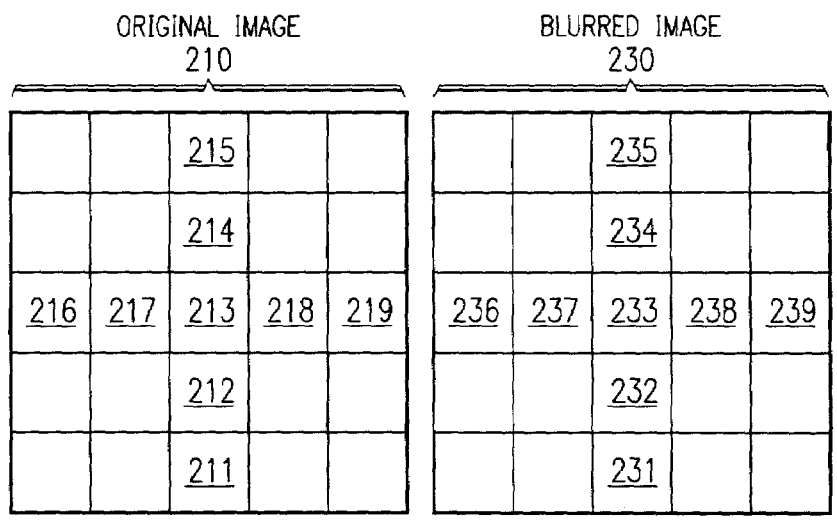
FIG. 2 is a block diagram illustrating an original image and a blurred image is used for describing a method of performing a blurring algorithm on the original image, according to one embodiment of the present invention.

Referring now to FIG. 2, a diagram of an original image and a blurred image are shown, according to one embodiment of the present invention. Original image 210, composed of 25 pixels, such as pixels 215–219, is used to generate blurred image 230, composed of 25 pixels, such as pixels 235–239. A blurring algorithm can be used to maintain sharp edges among rapidly changing contrasts, while blurring regions of less rapidly changing contrasts.

An original image 210 can be an electronic representation of an image scanned from film, scanned from print, or stored electronically in some form, such as on a computer disk or in a mass storage device. Original image 210 can contain detail which may not be appropriately represented when output to the display or in print. To improve the detail in image 210, the details must be brought out, in contrast to surrounding portions of the image. Image contrast in shadows must be high to brighten out detail in the dark regions of shadowed areas. However, simply increasing the image contrast could destroy detail found in highlighted areas. Highlighted areas must have the image contrast reduced to darken less lightened sections and bring out the details in areas which are almost overexposed on photographic film. However, simply dividing film into a highlight area and a shadow area will not suffice to improve complex images. Images can contain complex and diverse regions of varying contrast levels. To properly handle these images, a blurred image B can be generated.

In one embodiment of the present invention, pixels calculated for blurred image 230 relate to averages taken over regions of pixels in original image 210. For example, pixel 233 relates to calculations performed around pixel 213. In one embodiment, pixels 211, 212, 214, and 215 are used to determine the averaging that should be performed on pixel 213 to generate pixel 233. Pixel 213 can be seen as a central pixel, the value of which can be changed dependant on the values of its surrounding pixels. However, simply averaging the values of pixels 211–215 to determine pixel 233 is not adequate.

Averaging all the pixel values would simply create a blur of original image 210. Rapid changes in contrast among the pixels in original image 210 should be preserved as sharp edges in blurred image 230. To preserve sharp edges, changes in contrast must be accounted for. For example, if a sharp change in contrast is detected between pixels 213 and 214, the values of pixels 213 and 214 should not be averaged together, allowing the difference in contrast to be preserved as an edge. Furthermore, distance from the center pixel should also be a determining factor in calculating pixels in blurred image 230. If, for example, too large an area is considered, little blurring may result. If original image 210 contains a large variety of contrasts, a central pixel being considered, such as pixel 213, may not be altered by much since there may exist enough of a variety of pixels with intensities above and below its own intensity value.

Several factors must be considered in creating blurred image 230. Distance from the central pixel must be small enough to not average in too many variations in contrast; yet the distance must be large enough to create an adequate blurring of the central pixel. Accordingly, the pixels farther from the central pixel should be given less weight in averaging their values with the central pixel. For example, pixels 215 and 211 should be given less weight in determining the value of pixel 233, because they are farther away from the central pixel, pixel 213, than pixels 212 and 214. Furthermore, rapidly changing contrasts should also be accounted for. Accordingly, a function can be used to determine the weight of pixel values in original image 210 for determining pixel values for blurred image 230. The weighting equation can be described by the following equation:

$$w_N = \left(1 - \left|\frac{\text{pixelN} - \text{centerpixel}}{\text{Gain}}\right|\right)$$

The weight function, $w_N$, can be used to apply a separate weight to each of the pixel values. If the value of $w_N$ is returned as a negative value, the returned weight for the pixel being weighed can be zero. For example, if pixel 233 was being calculated, $w_N$ could be used to apply a weight to each of the pixels 211–215. PixelN is the contrast value of the pixel being weighed. Centerpixel is the contrast value of the central pixel, around which the blurring is being performed. For example, if pixel 236 is being calculated, the central pixel is pixel 216. Gain is a threshold value used to determine a contrast threshold for a sharp edge. For example, if pixel 233 is being calculated, the central pixel is 213. If the difference in contrast between pixel 213 and pixel 214 is 15, and Gain is set to 10, the returned value of $w_N$ is negative. Accordingly, in this example, pixel 214 is assigned a weight of zero, keeping the value of pixel 214 from affecting the averaging of pixel 213.

The value of Gain can be decreased as the pixel being weighed is further from the central pixel. Lowering the value of Gain allows small changes in the contrast between pixelN and centerpixel to result in negative $w_N$, and thus be weighed to zero. Accordingly, the farther the pixel is from the centerpixel, the smaller Gain gets and the more likelihood, that the pixel will be assigned a weight of zero. The choice of gain is chosen to preferably decrease slowly as the distance from the central pixel is increased. It has been found that slower changes in Gain provide images with more pleasing detail than sharper changes in Gain. However, the values of Gain used can be adapted for the desired application. Furthermore, the weight function itself can be altered without departing from the scope of the present invention.

Once the weights of the surrounding pixels have been calculated, a sum of each of the pixel values (multiplied by their relative weights) can be calculated. The sum can then be divided by the sum of the individual weights to generate the weighted average of the pixels, which can be used for the pixels of blurred image 230. The minimum weight calculated from the pixels adjacent to the central pixel can also be used and multiplied by each of the pixels surrounding the central pixel. Multiplying the weight of the adjacent pixel allows the blurring to be effectively turned 'off' if the contrast around the central pixel is changing too rapidly. For example, if the difference in contrast strictly warrants a sharp edge in blurred image 230, the weight should be close to zero, forcing all other values to zero and allowing the central pixel to retain its value, effectively creating a sharp edge in blurred image 230.

The processes performed to generate blurred image 230 can be likened to a sandblaster. A sandblaster can be used to soften, or blur, the textures it is working over. A sandblaster has an effective radius in which it is used over, with the material closer to the center of the sandblasting radius affected most. In the blurring algorithm described, a radius can be selected from the central pixel. The pressure of a sandblaster can be adjusted to affect more change. The Gain value in the described algorithm can be altered to affect more or less blurring. Accordingly, the blurring algorithm used will be herein referred to as the sandblaster algorithm.

The sandblaster algorithm can be performed in one dimensional increments. For example, to calculate the value of pixel 237, the pixels surrounding pixel 217 are considered. In one embodiment of the present invention, the averaged pixel values are determined using the neighboring vertical pixels and then the neighboring horizontal pixel values. For example, when calculating pixel 233, the pixels surrounding pixel 213 are preferably considered. Pixels 211, 212, 214, and 215 would initially be used to average the value of pixel 213 for pixel 233. Then the values of pixels 216, 217, 218, and 219 would be taken into account. Alternatively, windows can be generated and applied to average in pixels around the central pixel together, in both the horizontal and vertical directions. Color images can be composed of multiple image planes, wherein the multiple image planes may include planes for each color, a red plane, a green plane, and a blue plane. In a preferred embodiment, the sandblaster algorithm is only performed on one plane at a time. Alternatively, the sandblaster algorithm can be calculated taking other image planes into account, calculating in the values of pixels relative to the central pixel but in a different color plane. However, it should be noted that by performing such multi-dimensional calculation over an image may increase the processing overhead. Additionally, pixels which are near an image edge, such as image 216 may ignore values desired from pixels beyond the limits of original image 210. In one embodiment, the images along the edge use their value to reproduce pixels values beyond the image edge, for calculation of the sandblaster algorithm. Additionally, zeroes may be taken for values lying outside original image 210. Furthermore, a wraparound effect may be employed, wherein the values of pixels on the other side of original image 210 are used. For example, the value of pixel 219 may be used in considering the neighbors of pixel 216.

Figure 3:
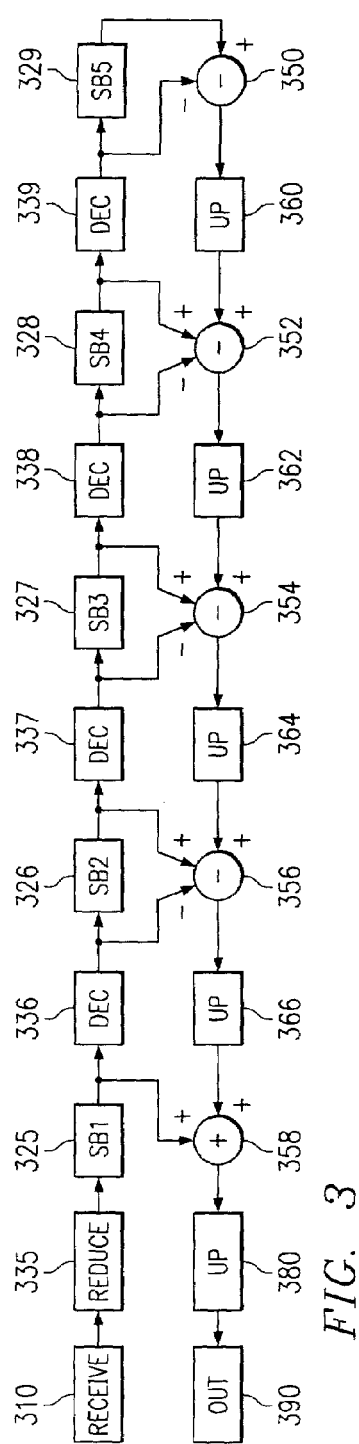
FIG. 3 is a block diagram of a method for generating an image mask, according to at least one embodiment of the present invention.

Referring now to FIG. 3, a block diagram of a method for generating an image mask is shown, according to at least one embodiment of the present invention. As previously discussed, the sandblaster blurring algorithm can be used to create a blurred image with sharp edges and blurred regions. To improve the detail captured by an image mask incorporating the sandblaster blurring algorithm, a pyramidal decomposition is performed on the original image, as shown in FIG. 3.

In step 310, the original image is received. As previously discussed, the original image is a digital image representation of an image, taken through scanning or other methods. In step 335, the image size is reduced. In at least one embodiment, the image size is reduced in half. The reduction in image size may be performed using a standard digital image decimation. In one embodiment, the decimation is performed by discarding every other pixel in the original image from step 310.

In step 325, the sandblaster blurring algorithm, as discussed in FIG. 2, is performed on the decimated image to create a blurred image. In step 336, the blurred image is decimated once again. In step 326, the decimated image from step 336 is blurred using the sandblaster blurring algorithm. Further decimation steps 337–339 and sandblaster blurring steps 327–329 are consecutively performed on the outputs of previous steps. In step 350, the blurred image from the sandblaster step 329 is subtracted from the decimated output from the decimation step 350. In step 360, the mixed output from step 350 is up-sized. In one embodiment, the image is increased to twice its pixel resolution. Increasing the image size may be performed by simply repeating the image values present for new pixels. Pixel interpolation may also be performed to determine the values of the new pixels in step 352, the up-sized image from step 360, is added to the blurred image from step 328. The combined image information is subtracted from the decimated output from step 338. The calculations in step 352 are performed to recover image detail that may have been lost. Mixer steps 354 and 352, consecutively performed with up-size steps 362–366, attempt to generate mask data. In step 358, a mixer is used to combine the up-sized image data from step 366 with the blurred image data from step 325. The output from the mixer in step 358 is then up-sized, in step 380, to produce the image mask of the received image. The image mask is then prepared for delivery and use, as in step 390.

It will be appreciated that additional or less blurring may be performed among the steps of the pyramidal decomposition described herein. It should be noted that by not performing the blurring algorithm on the original image, much processing time may be reduced. Calculations based on the decimated images can be performed faster and with less overhead than calculations based off the original image, producing detailed image masks. The image masks produced using the described method preferably include sharp edges based on rapidly changing boundaries found in the original image, and blurred regions among less rapidly changing boundaries.

In the described embodiment, pyramidal decomposition is performed along a single image color plane. It will be appreciated that additional color planes may also be presented in the steps shown. Furthermore, information from different color planes may be processed concurrently. According to at least one embodiment of the present invention, the resultant image mask generated is a monochrome mask, used to apply itself to the intensities of the individual image color planes in the original image. A monochrome image plane can be calculated from separate image color planes. For example, in one embodiment, the values of the monochrome image mask are determined using the following equation:

$$OUT = MAX(R, G).$$

OUT refers to the pixel of the monochromatic image mask. MAX(R,G) is a function in which the maximum intensity between the intensity value of the pixel in the red plane and the intensity value of the pixel in the green plane is chosen. In the case of a mask pixel which contains more than 80% of its intensity from the blue plane, the formula can be appended to include:

$$OUT = OUT + 50\% \, B.$$

wherein 50% B is half of the intensity value in the blue plane. The image mask may also be made to represent image intensities, such as the intensity among black and white values. It will be appreciated that while full color image masks may be used, they will require heavier processing overhead.

Figure 4:
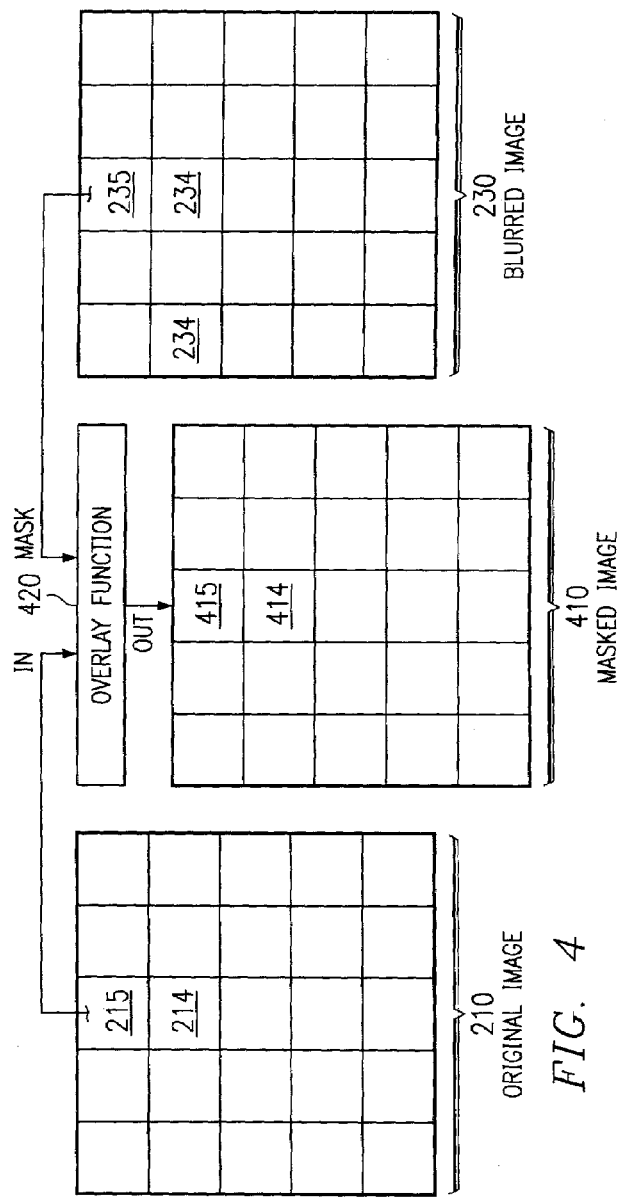
FIG. 4 is a block diagram illustrating a method of applying an image mask to an image, according to at least one embodiment of the present invention.

Referring now to FIG. 4, a method for generating a masked image is shown, according to at least one embodiment of the present invention. Image information related to an original image 210 is mathematically combined with intensity information from an image mask 230. The combined data is used to create a masked image 410, which contains improved reproducible image detail over the original image 210.

Image data to generate masked image 410 can be calculated on a pixel by pixel basis. Each corresponding pixel from original image 210 and image mask 230 is combined to form a pixel on masked image 410. For example, pixel data from pixel 215, of original image 210, is combined with pixel information from pixel 235, of image mask 230, using mathematical manipulation, such as overlay function 420. The combined data is used to represent pixel 415 of masked image 410.

Overlay function 420 is a function used to overlay the pixel information between original image 210 and image mask 230. In one embodiment of the present invention, overlay function 420 involves mathematical manipulation and is defined by the equation:

$$OUT = \frac{IN}{\frac{3}{4}MASK + \frac{1}{4}}$$

OUT refers to the value of the pixel in masked image 410. IN refers to the value of the pixel taken from original image 210. MASK refers to the value of the corresponding pixel in image mask 230. For example, to produce the output value of pixel 414, the value of pixel 214 is divided by ¾ the value of pixel 234, added with an offset. The offset, ¼, is chosen to prevent an error from occurring due to diving by zero. The offset can also be chosen to lighten shadows in the resultant masked image 410.

As previously discussed, image mask 230 can be a monochromatic mask. The mask can be used to control the white and black levels in images. Grayscale contrast is the contrast over large areas in an image. Image contrast can be used to refer to the contrast of details within an image. Through manipulation of overlay function 420, the grayscale contrast and the image contrast can be altered to best represent original image 210. In one embodiment of the present invention, overlay function 420 is altered according to settings made by a user. Independent control of the image contrast and grayscale contrast can be provided. Control can be used to produce images using low image contrast in highlights and high image contrast in shadows. Additionally, functions can be added to control the generation of the mask. Control can be offered over the pressure (Gain) and radius (region) effected through the sandblaster blurring algorithm (described in FIG. 2). Additionally, control over the histogram of the image can be offered through control over the image contrast and the grayscale contrast. A normalized image can be generated in which histogram leveling can be performed without destroying image contrast. The controls, functions, and algorithms described can be performed within an information handling system. It will be appreciated that other systems may be employed, such as through image processing kiosks, to produce masked image 410, in keeping with the scope of the present invention.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method of generating a dynamic image mask comprising:

scanning an image to produce a digital original image comprised of a plurality of pixels corresponding to a spatial location in the image, wherein each pixel includes an original value corresponding to a characteristic of the image; and calculating a dynamic image mask value for each pixel by averaging the original value of a pixel with only the original values of the pixels proximate that pixel having original values lower than a threshold sharpness.

2. The method of claim 1, wherein scanning an image comprises scanning a film image.

3. The method of claim 1, wherein scanning an image comprises scanning a photographic print.

4. The method of claim 1, wherein the original value corresponding to a characteristic of the image comprises an intensity value corresponding to a color.

5. The method of claim 1, wherein the original value corresponding to a characteristic of the image comprises an intensity value corresponding to luminance.

6. The method of claim 1, wherein the original value corresponding to a characteristic of the image comprises an intensity value corresponding to range of frequencies.

7. The method of claim 1, wherein averaging the original value of a pixel with only the original values of the pixels proximate that pixel having original values less than a sharpness threshold comprises averaging the original value of a pixel with only the weighted original values of the pixels proximate that pixel having original values less than a sharpness threshold.

8. The method of claim 7, wherein the weighted original values are determined according to the following formula:

$$w_N = \left(1 - \left|\frac{pixelN - centerpixel}{Gain}\right|\right),$$

wherein pixelN is the value of the pixel being weighed, centerpixel is the value of a central pixel, and wherein Gain is the threshold sharpness.

9. The method of claim 1, wherein the original values used to calculate the difference less than the sharpness threshold correspond to different characteristics than the original values used in averaging.

10. The method of claim 1, wherein calculating a dynamic image mask value includes performing a pyramidal decomposition on the original image.

11. The method of claim 1, wherein the proximity of the pixels used to calculate the dynamic image mask value can be varied by a user.

12. The method of claim 1, wherein the sharpness threshold can be varied by a user.

13. A method of generating an image mask comprising:
scanning an image to produce a digital original image;
generating a decimated representation of the original image;
applying a blurring algorithm to form a blurred representation of the decimated representation, wherein the blurred representation includes a plurality of pixels having varying values to form sharp edges representative of rapidly changing boundaries in the decimated image and less sharp regions corresponding to regions of less rapidly changing values in the decimated image; and
combining the blurred representation with the decimated representation.

14. The method of claim 13, wherein the combination of the blurred representation with the decimated representation is used to generate an image mask.

15. The method of claim 13, wherein a plurality of decimated images are generated to form sequential levels in a pyramidal decomposition formation, and a sequential level is formed by decimating the image of the current level.

16. The method of claim 13, wherein image detail is arranged over an area having a particular radius, and the blurring algorithm is capable of blurring detail found in the original image over a radius proportional to the particular radius in which the image detail is arranged.

17. The method of claim 13, wherein the blurring algorithm is performed on decimated representations of a plurality of levels of the pyramidal decomposition formation, prior to forming the image of the next level.

18. The method of claim 13, wherein the value of a pixel in the blurred representation is dependent upon a contrast between a corresponding pixel in the decimated image and pixels proximate to the corresponding pixel.

19. The method of claim 13, wherein the value of a pixel in the blurred representation is dependent upon a rate of change in contrast between a corresponding pixel in the decimated image and pixels proximate to the corresponding pixel.

20. The method of claim 13, wherein the blurring algorithm includes averaging the value of a central pixel corresponding to the pixels in the blurred representation with weighted values of a plurality of neighboring pixels.

21. A method for enhancing a scanned image comprising:
scanning an image to produce a digital original image comprised of a plurality of pixels corresponding to a spatial location in the image, wherein each pixel includes an original value corresponding to a characteristic of the image;
calculating a dynamic image mask value for each pixel by averaging the original value of a pixel with the original values of the pixels proximate that pixel having original values lower than a threshold sharpness; and
applying the dynamic image mask value to the original value for each corresponding pixel using a mathematical function to produce an enhanced scanned image.

22. The method of claim 21, wherein scanning an image comprises scanning a transparency based image.

23. The method of claim 21, wherein scanning an image comprises scanning a reflective based image.

24. The method of claim 21, wherein the original value corresponding to a characteristic of the image comprises an intensity value corresponding to a color.

25. The method of claim 21, wherein the original value corresponding to a characteristic of the image comprises an intensity value corresponding to range of frequencies.

26. The method of claim 21, wherein averaging the original value of a pixel with only the original values of the pixels proximate that pixel having original values less than a sharpness threshold comprises averaging the original value of a pixel with only the weighted original values of the pixels proximate that pixel having original values less than a sharpness threshold.

27. The method of claim 26, wherein the weighted original values are determined according to the following formula:

$$w_N = \left(1 - \left|\frac{pixelN - centerpixel}{Gain}\right|\right),$$

wherein pixelN is the value of the pixel being weighed, centerpixel is the value of a central pixel, and wherein Gain is the threshold sharpness.

28. The method of claim 21, wherein the original values used to calculate the difference less than the sharpness threshold correspond to different characteristics than the original values used in averaging.

29. The method of claim 21, wherein calculating a dynamic image mask value includes performing a pyramidal decomposition on the original image.

30. The method of claim 21, wherein the mathematical function comprises division.

31. The method of claim 21, wherein the mathematical function comprises:

$$OUT = \frac{IN}{\frac{3}{4}MASK + \frac{1}{4}},$$

wherein OUT is the value of the pixel being calculated in the enhanced scanned image, IN is the value of the relative pixel in the original image, and MASK is the value of the relative pixel in the dynamic image mask.

32. The method of claim 21, further comprising performing histogram leveling to the enhanced scanned image.

33. The method of claim 21, wherein the enhanced scanned image includes an image contrast and a grayscale contrast.

34. The method of claim 33, wherein the image contrast and the grayscale contrast can be controlled independently of each other.

35. The method of claim 21, wherein the dynamic image mask value may be proportionally varied by a user.

36. A scanner system comprising:
  a light source operable to illuminate an image disposed within a media;
  a sensor system operable to measure the illumination from the image and produce electronic signals;
  a processor operable to receive the electronic signals and produce image values for each pixel; and
  a memory media having software stored thereon, wherein the software is operable to:
    calculate a dynamic image mask value for each pixel by averaging the image value of a pixel with the image values of the pixels proximate that pixel having image values lower than a threshold sharpness; and
    apply the dynamic image mask value to the image value for each corresponding pixel using a mathematical function to produce an enhanced scanned image.

37. The scanner system of claim 36, wherein the sensor system operates to measure the illumination transmitted through the image.

38. The scanner system of claim 36, wherein the sensor system operates to measure the illumination reflected from the image.

39. The scanner system of claim 36, further comprising a printer operable to print the enhanced scanned image.

40. The scanner system of claim 39, wherein the printer comprises a photographic printer.

41. The scanner system of claim 39, wherein the printer comprises an ink type printer.

* * * * *